(12) United States Patent
Matsuura et al.

(10) Patent No.: US 10,705,544 B2
(45) Date of Patent: Jul. 7, 2020

(54) FLUID CONTROL UNIT AND PROGRAM STORAGE MEDIA FOR FLUID CONTROL UNIT

(71) Applicant: HORIBA STEC, Co., Ltd., Kyoto-shi, Kyoto (JP)

(72) Inventors: Kazuhiro Matsuura, Kyoto (JP); Masao Yamaguchi, Kyoto (JP); Kentaro Nagai, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 187 days.

(21) Appl. No.: 15/910,869

(22) Filed: Mar. 2, 2018

(65) Prior Publication Data

US 2018/0253112 A1    Sep. 6, 2018

(30) Foreign Application Priority Data

Mar. 6, 2017  (JP) ................................. 2017-041577

(51) Int. Cl.
  *G05D 7/06*   (2006.01)
  *G05B 6/02*   (2006.01)

(52) U.S. Cl.
  CPC ............. *G05D 7/0635* (2013.01); *G05B 6/02* (2013.01)

(58) Field of Classification Search
  CPC ................................ G05D 7/0635; G05B 6/02
  See application file for complete search history.

(56) References Cited

U.S. PATENT DOCUMENTS

| 2009/0248213 | A1* | 10/2009 | Gotoh | G05D 7/0635 |
| | | | | 700/282 |
| 2011/0106319 | A1* | 5/2011 | Takahashi | G05B 11/06 |
| | | | | 700/282 |
| 2014/0000610 | A1* | 1/2014 | Rapoport | A61M 16/0066 |
| | | | | 128/204.23 |
| 2017/0109722 | A1* | 4/2017 | Morris | G06Q 50/06 |

FOREIGN PATENT DOCUMENTS

JP   2007034550 A   2/2007

* cited by examiner

*Primary Examiner* — Ziaul Karim
(74) *Attorney, Agent, or Firm* — Alleman Hall Creasman & Tuttle LLP

(57) ABSTRACT

In order to restrain generation of a peak in the measured flow rate, a fluid control unit measures a flow rate of a fluid in a channel and outputs a signal indicating a valve operation amount of a fluid control valve obtained based on a deviation between a preset flow rate and a measured flow rate and a control coefficient, and the control coefficient for a stable state and the control coefficient for a transitional state are so set to moderate fluctuation of the valve operation amount to the deviation more in the transitional state than in the stable state. At or shortly after a timing when the stable state is switched to the transitional state, a signal is output that indicates an operation amount for a switching time calculated based on each of the operation amounts output at a plurality of timings in the stable state.

7 Claims, 13 Drawing Sheets

FLUID CONTROL UNIT AND PROGRAM STORAGE MEDIA FOR FLUID CONTROL UNIT

FIELD OF THE ART

This invention relates to a fluid control unit that controls a flow rate of a material gas used for, for example, a semiconductor manufacturing process and programs for fluid control unit used for this fluid control unit.

BACKGROUND ART

As this type of the fluid control unit, as shown in the patent document 1, there is a fluid control unit that comprises a flow rate measurement part that measures a flow rate of a fluid flowing in a flow channel and a fluid control valve arranged in the flow channel, and that controls a valve aperture of the fluid control valve so as to make a measured flow rate measured by the flow rate measurement part follow a preset flow rate.

More concretely, the fluid control unit outputs a valve aperture operation amount of the fluid control valve so as to lessen a deviation between the measured flow rate and the preset flow rate by the use of the deviation and a control coefficient such as a previously set PID coefficient or the like. A case that the valve aperture operation amount is an applied voltage to the fluid control valve will be explained below.

First, considered is a stable state wherein the deviation between the measured flow rate and the preset flow rate is small so that behavior of the measured flow rate is stable. In this stable state, a gain of the above-mentioned control coefficient is set to be big so that fluctuation of the applied voltage to the deviation becomes big. This arrangement is to keep the behavior of the measured flow rate in the stable state by immediately returning the applied voltage after the noise fluctuation around the middle value, even though the applied voltage that is stable around a certain value (hereinafter called as a middle value) appropriate for control in a stable state fluctuates (hereinafter called as causing a noise fluctuation) due to an external disturbance.

On the other hand, a transitional state wherein the measured flow rate fluctuates toward the preset flow rate after it fluctuates is considered by changing the preset flow rate. In this case, if the control coefficient is big, fluctuation of the applied voltage after the preset flow rate fluctuates becomes too big so that so called undershoot or overshoot occurs. Then, the overshoot or the undershoot is restrained by setting the gain of the control coefficient in the transitional state to be small relative to that in the stable state.

However, in the above-mentioned control method, as shown in FIG. 12, in case that the noise fluctuation occurs on the applied voltage at a timing when the stable state is switched to the transitional state, since the control coefficient is so set to moderate the fluctuation of the applied voltage in the transitional state, the applied voltage does not quickly return in the transitional state after the noise fluctuation.

In accordance with this arrangement, if the noise fluctuation tends to increase, the valve aperture of the fluid control valve unexpectedly becomes big in the transitional state. Conversely, if the noise fluctuation tends to decrease, the valve aperture of the fluid control valve unexpectedly becomes small in the transitional state. As a result of this, as shown in FIG. 13, for example, a spike-shaped peak appears on the measured flow rate.

PRIOR ART DOCUMENTS

Patent Document

Patent document 1: Japanese Unexamined Patent Application Publication No. 2007-34550

Disclosure of the Invention

Problems to be Solved by the Invention

The present claimed invention intends to solve all of the problems and a main object of this invention is to provide a fluid control unit that can restrain a peak generating in the measured flow rate by controlling the fluid control valve with the control coefficient set to moderate the valve aperture operation amount to the deviation between the measured flow rate and the preset flow rate in the transitional state more than in the stable state.

Means to Solve the Problems

More specifically, a fluid control unit of this invention comprises a flow rate measurement part that measures a flow rate of a fluid flowing in a flow channel, a fluid control valve that is arranged in the flow channel, and a valve aperture operation amount output part that outputs a valve aperture operation amount signal indicating a valve aperture operation amount of the fluid control valve obtained based on a deviation between a previously preset flow rate and a measured flow rate of the flow rate measurement part and a previously set control coefficient, and is characterized by that the control coefficient for a transitional state wherein the measured flow rate fluctuates due to fluctuation of the preset flow rate and the control coefficient for a transitional state wherein the measured flow rate fluctuates due to fluctuation of the preset flow rate are so set to moderate fluctuation of the valve aperture operation amount to the deviation more in the transitional state than in the stable state, and at a timing when the stable state is switched to the transitional state or before a predetermined time period passes after the timing, the valve aperture operation amount output part outputs a valve aperture operation amount output signal for switching time indicating a valve aperture operation amount for switching time calculated based on each of the valve aperture operation amounts output at a plurality of timings in the stable state.

In accordance with the fluid control unit having the above-mentioned arrangement, since the valve aperture operation amount for switching time calculated based on each valve aperture operation amount output at a plurality of timings in the stable state is output at a timing when the stable state is switched to the transitional state or before the predetermined time period passes after the timing, even though a noise fluctuation occurs at the timing, the valve aperture operation amount after the noise fluctuation immediately becomes the valve aperture operation amount for switching time. Accordingly, if the valve aperture operation amount for switching time is set to be a value around a middle amount of the valve aperture amount in the stable state, the control state becomes almost the same as the state without noise at the timing when the stable state is switched to the transitional state after the output of the valve aperture operation amount for switching time. As a result of this, it becomes possible to prevent the peak generating in the measured flow rate resulting from the disturbance without unexpectedly changing the valve aperture of the fluid control valve in the transitional state after the valve aperture operation amount for switching time is output.

In order to make the valve aperture operation amount at a middle value of the valve aperture operation amount in the stable state or at a value around the middle value, it is preferable to comprise a valve aperture operation amount calculation part for switching time that calculates a mean value of the valve aperture operation amounts output by the valve aperture operation amount output part in the stable state as the valve aperture operation amount for switching time.

However, although the valve aperture operation amount for switching time is output at the timing when the stable state is switched to the transitional state or before the predetermined time period passes after the timing, some error might occur between the valve aperture operation amount for switching time and the middle value of the vale aperture operation amount in the stable state. As this result, if the difference is big, the fluctuation of the valve aperture operation amount at the timing when the stable state is switched to the transitional state becomes big. Then similar to the noise fluctuation, the valve aperture of the fluid control valve unexpectedly changes in the transitional state so that the peak may occur in the measured flow rate.

As a method for restraining the peak occurring in the measured flow rate conceived is a method wherein the fluctuation of the valve aperture operation amount occurring at the timing when the stable state is switched to the transitional state is immediately returned to the value around the middle value by continuously using the control coefficient whose gain is big in the stable state also after the stable state is switched to the transitional state, namely after the preset flow rate fluctuates.

However, if the control coefficient whose gain is big is continuously used, in case that the preset flow rate fluctuates largely, the above-mentioned undershoot or overshoot is concerned.

Then, in order to repress the peak occurring in the measured flow rate more while restraining the undershoot or overshoot, it is preferable that the fluid control unit is so configured that the control coefficient in the stable state before the preset flow rate fluctuates from the first flow rate to the second flow rate is continuously used also after the timing when the preset flow rate fluctuates from the first flow rate to the second flow rate, in case that the preset flow rate fluctuates from a first flow rate to a second flow rate and a difference between the first flow rate and the second flow rate is smaller than a predetermined threshold.

In accordance with this arrangement, since the control coefficient in the stable state is continuously used also after the timing when the preset flow rate fluctuates, it is possible to immediately return the valve aperture operation amount to the value around the middle value in the stable state even though there is another fluctuation separated from the noise fluctuation at the timing when the stable state is switched to the transitional state. With this arrangement, it is possible to prevent the valve aperture of the fluid control valve from unexpectedly changing in the transitional state and to suppress the peak occurring in the measured flow rate.

In order to automatically switch whether or not the control coefficient in the stable state is continuously used also after the preset flow rate fluctuates, it can be conceived to further comprise a transitional/stable state judgment part that compares the difference between the first flow rate and the second flow rate with the predetermined threshold, and in case that the difference is bigger than the predetermined threshold, the transitional/stable state judgment part judges that a predetermined period after the timing when the preset flow rate fluctuates from the first flow rate to the second flow rate is in the transitional state, and in case that the difference is smaller than the predetermined threshold, the transitional/stable state judgment part judges that a period from the timing when the preset flow rate fluctuates from the first flow rate to the second flow rate to a time when the preset flow rate is the second flow rate is in the stable state.

In case that the preset flow rate is set as a flow rate that decreases or increases in a phased manner over a predetermined period, the above-mentioned operation and effect are remarkably produced.

In addition, a program for fluid control unit in accordance with this invention is a program that is used for a fluid control unit comprising a flow rate measurement part that measures a flow rate of a fluid flowing in a flow channel and a fluid control valve provided in the flow channel, and provides a computer with a function as a valve aperture operation amount output part that outputs a valve aperture operation amount signal indicating a valve aperture operation amount of the fluid control valve obtained based on a deviation between a previously preset flow rate and a measured flow rate of the flow rate measurement part and a previously set control coefficient, and the control coefficient for a stable state wherein the measured flow rate is stable and the control coefficient for a transitional state wherein the measured flow rate fluctuates due to fluctuation of the preset flow rate are so set to moderate fluctuation of the valve aperture operation amount to the deviation more in the transitional state than in the stable state, and at a timing when the stable state is switched to the transitional state or before the predetermined time period passes after the timing, the valve aperture operation amount output part outputs a valve aperture operation amount output signal for switching time indicating a valve aperture operation amount for switching time calculated based on each of the valve aperture operation amounts output at a plurality of timings in the stable state.

In accordance with the program for the fluid control unit, it is possible to obtain the same operation and effect as those of the above-mentioned fluid control unit.

Effect of the Invention

In accordance with this invention having the above-mentioned arrangement, it is possible to restrain the peak generating in the measured flow rate in the control wherein the control coefficient is set so as to moderate the valve aperture operation amount to the deviation between the measured flow rate and the preset flow rate more in the transitional state than in the stable state.

BEST MODES OF EMBODYING THE INVENTION

First Embodiment

Figure 1:
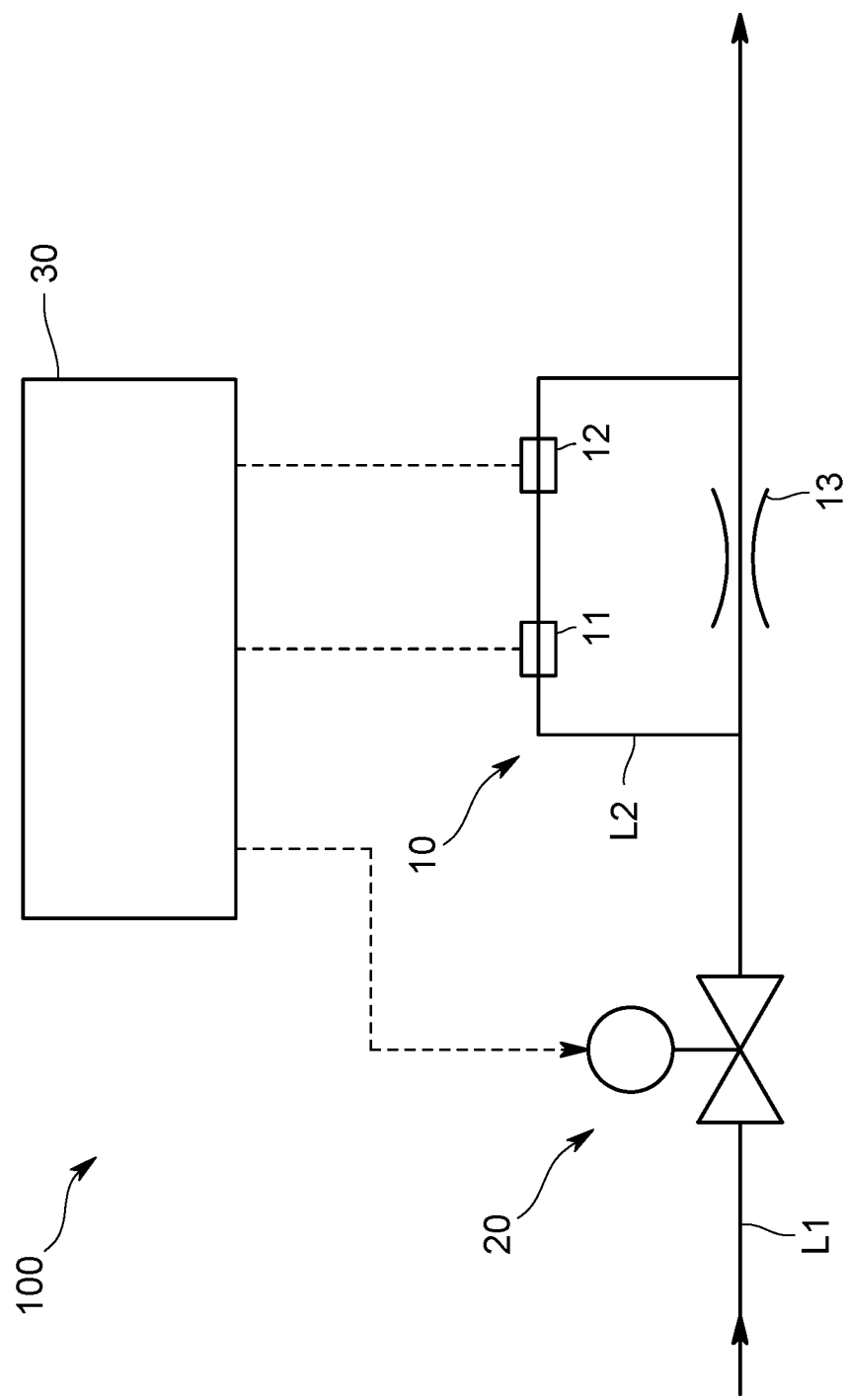
FIG. 1 is a schematic view showing an overall configuration of a fluid control unit of the first embodiment.

A fluid control unit 100 of this embodiment is a mass flow controller that controls a flow rate of a material gas used in, for example, a semiconductor manufacturing process and comprises, as concretely shown in FIG. 1, a flow channel L1 where a fluid flows, a flow rate measurement part 10 that is arranged in the flow channel L1 and that measures a flow rate of the fluid flowing in the flow channel L1, a fluid control valve 20 arranged in an upstream of the flow rate measurement part 10 and a control unit 30 that controls a valve aperture of the fluid control valve 20.

The flow rate measurement part 10 measures a flow rate as being a physical amount of the fluid flowing in the flow channel L1, and is, so called a thermal type flowmeter in this embodiment.

Concretely, the flow rate measurement part 10 comprises a laminar element 13 as being a flow cannel resistance arranged in the flow channel L1, a sensor flow channel L2 that converges into the flow channel L1 in a downstream of the laminar element 13, a first temperature sensor 11 and a second temperature sensor 12 arranged in the upstream side and the downstream side respectively in the sensor flow channel L2 and a flow rate calculation part 14 that calculates a flow rate of the fluid flowing in the flow channel L1 based on a difference between the temperatures measured in the first temperature sensor 11 and the second temperature sensor 12.

The flow rate calculation part 14 makes use of an arithmetic function of the control unit 30 to be described later.

The fluid control valve 20 controls the flow rate of the fluid flowing in the flow channel L1 by adjusting the valve aperture thereof, and is of a piezoelectric type in this embodiment and the valve aperture can be changed by an actuator comprising a piezoelectric element.

More concretely, the fluid control valve 20 drives the actuator by being given a valve aperture operation amount signal from outside (a valve aperture operation amount output part 32, to be described later, in this embodiment), and adjusts the valve aperture in accordance with the valve aperture operation amount signal so that the flow rate is controlled.

Figure 2:
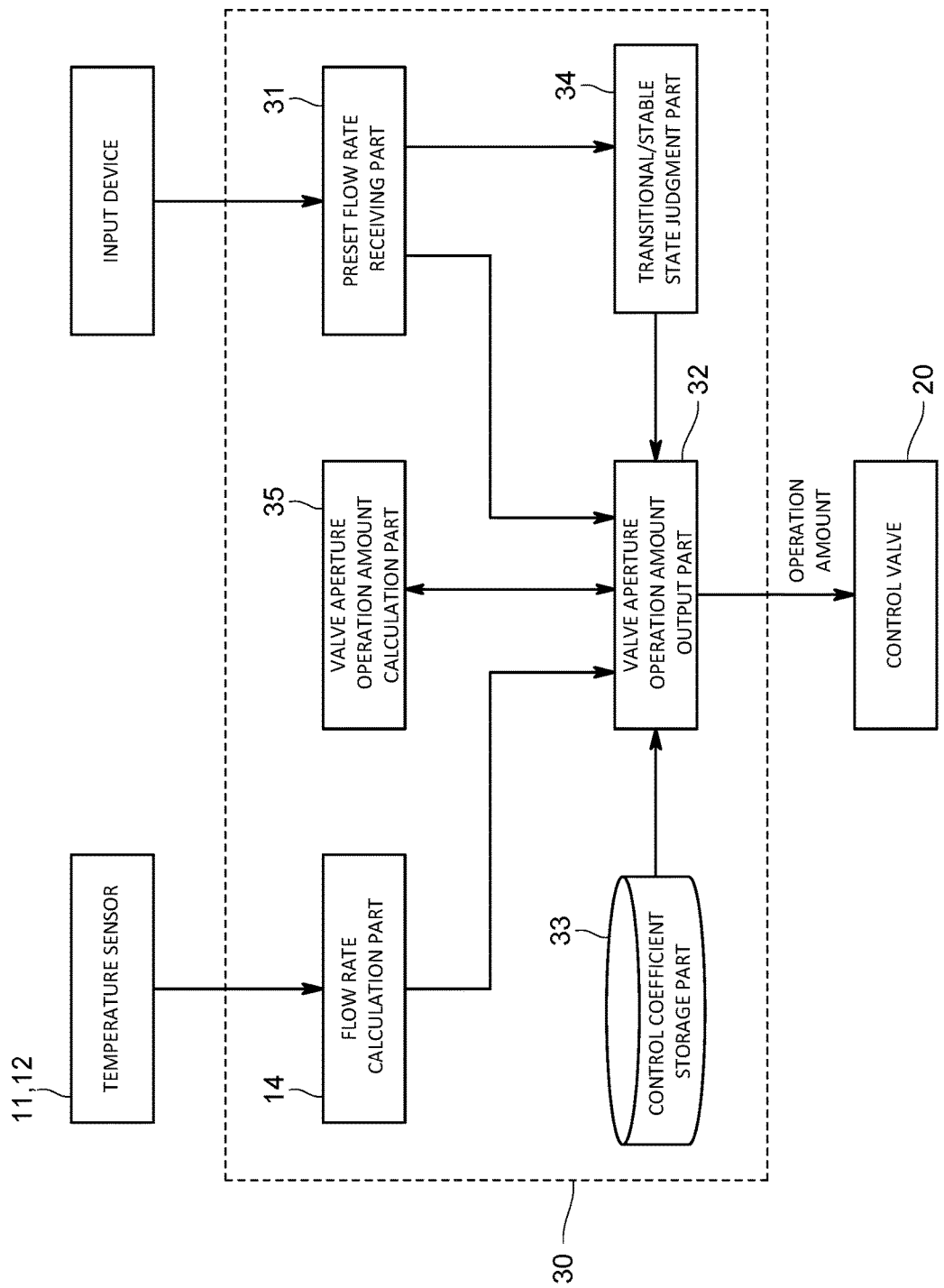
FIG. 2 is a function block diagram showing a function of the control of the first embodiment.

The control unit 30 is, so called, a computer comprising a CPU, a memory, an AC/DC converter and an input device, and, as shown in FIG. 2, has functions as a flow rate calculation part 14, a preset flow rate receiving part 31, the valve aperture operation amount output part 32, a control coefficient storage part 33, a transitional/stable state judgment part 34 and a valve aperture operation amount calculation part for switching time 35.

Each part will be explained below.

As described above, the flow rate calculation part 14 calculates the flow rate of the fluid flowing in the flow channel L1 based on the temperature difference measured by each of the temperature sensors 11, 12. Concretely, the flow rate calculation part 14 calculates a mass flow rate of the fluid flowing in the sensor flow channel L2 based on the temperature difference and calculates a mass flow rate of the fluid flowing in the flow channel L1 based on a separation ratio between the flow channel L1 and the sensor flow channel L2.

The preset flow rate receiving part 31 receives a preset flow rate input by a user through the input device such as, for example, a keyboard.

The preset flow rate can be appropriately changed by the user, however, there is a case that the preset flow rate fluctuates in accordance with the time course such that the preset flow rate is set to increase or decrease in the middle of the control, or that the increase or the decrease of the flow rate is set to repeat.

Figure 3:
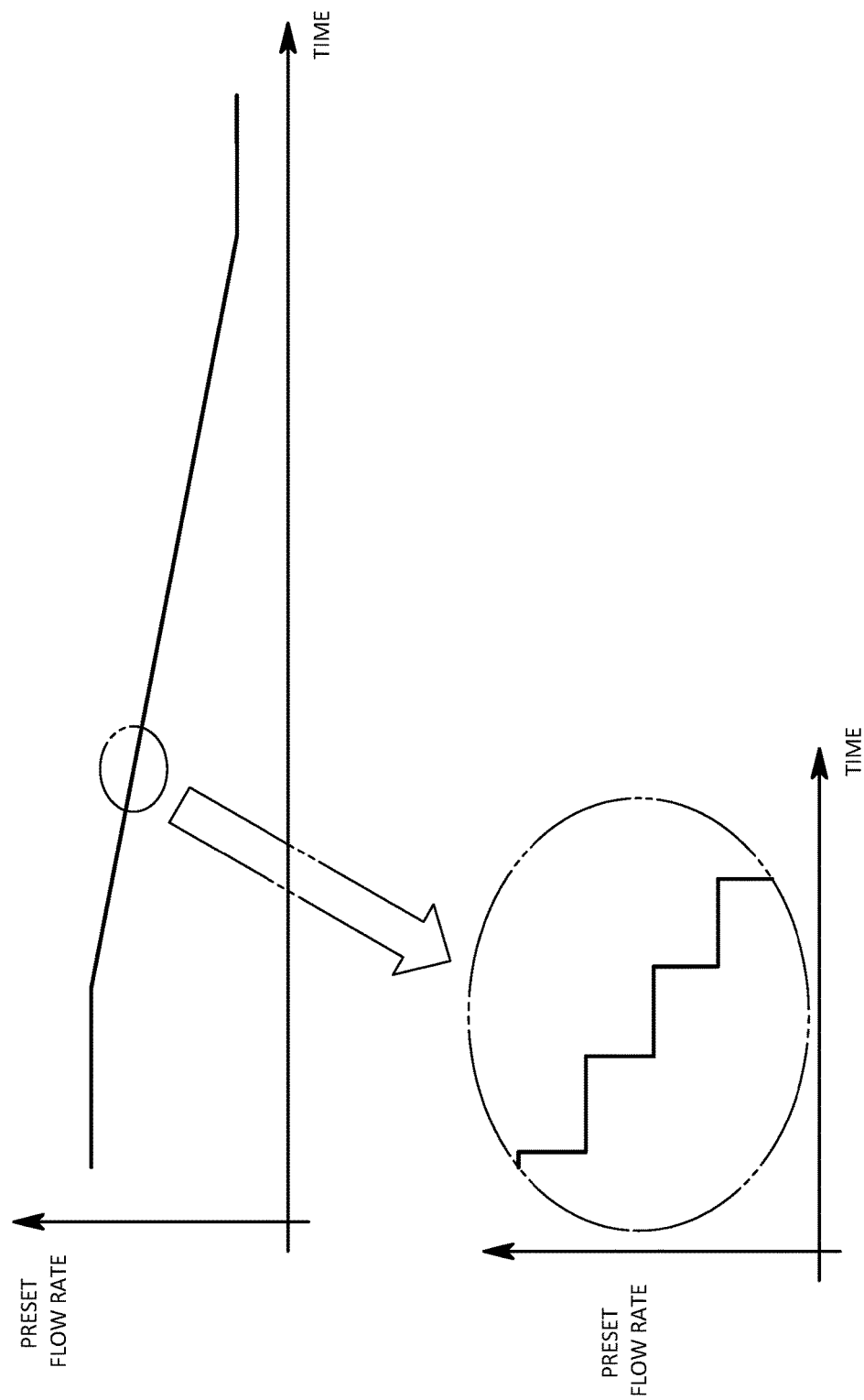
FIG. 3 is a diagram to explain a preset flow rate of the first embodiment.

As one example of the preset flow rate, as shown in FIG. 3, explained is a case wherein the preset flow rate is set to decrease in stages microscopically over the predetermined period and to gradually decrease macroscopically. It is a matter of course that the preset flow rate may be so set to increase in stages microscopically over the predetermined period and to gradually increase macroscopically.

The valve aperture operation amount output part 32 obtains the preset flow rate received by the preset flow rate receiving part 31, obtains the measured flow rate calculated by the flow rate calculation part 14 and outputs the valve aperture operation amount signal indicating the valve aperture operation amount of the fluid control valve 20 to the fluid control valve 20 so as to lessen the deviation.

More concretely, the valve aperture operation amount output part 32 obtains a proportion coefficient, an integration coefficient and a differential coefficient stored in the control coefficient storage part 33 formed in a predetermined area of the memory and calculates an applied voltage as being the valve aperture operation amount by conducting a PID operation on the deviation between the preset flow rate and the measured flow rate by the use of these control coefficients. Then, the valve aperture operation amount output part 32 is so configured that the valve aperture operation amount signal indicating a magnitude of the calculated applied voltage is output to the fluid control valve 20 and the valve aperture of the fluid control valve 20 is feedback controlled.

The control coefficient may be not only the integration coefficient and the differential coefficient but also a function containing the temperature or the like.

Figure 4:
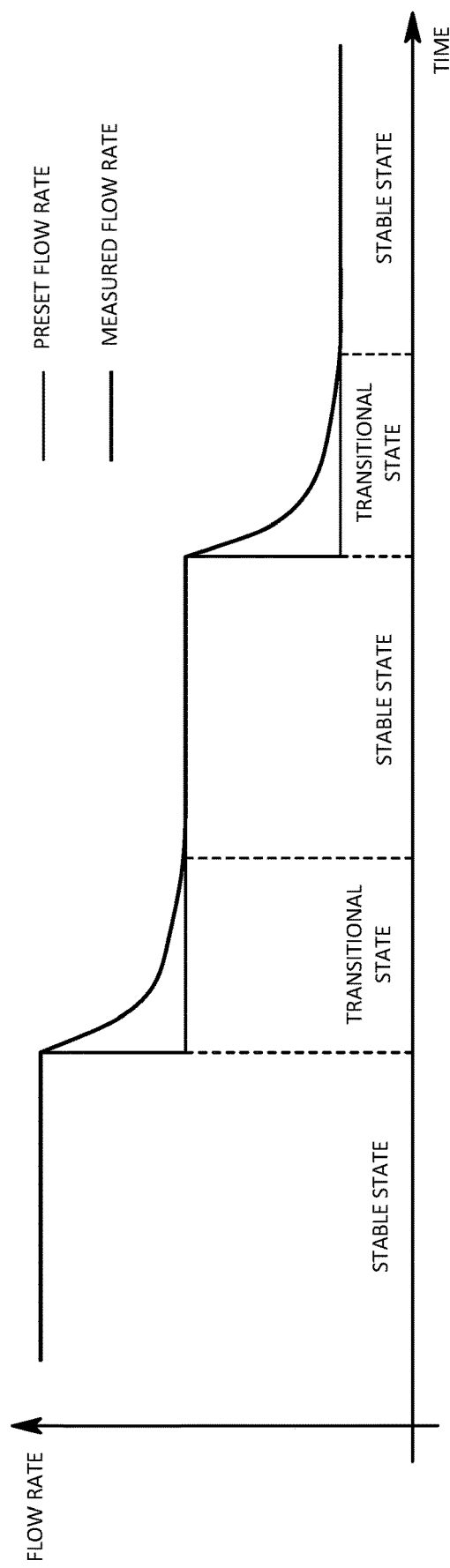
FIG. 4 is a diagram to explain a stable state and a transitional state of the first embodiment.

Behavior of the flow rate (the measured flow rate measured by the flow rate measurement part 10 in this embodiment) due to the feedback control by the use of the above-mentioned PID operation will be explained with reference to FIG. 4.

In this embodiment, as mentioned above, since the preset flow rate is so set that the flow rate decreases in stages microscopically, as the behavior of the measure flow rate, the stable state wherein the deviation between the measured flow rate and the preset flow rate is small so that the measured flow rate is stable and the transitional state wherein the measured flow rate fluctuates toward the preset flow rate after the fluctuation by fluctuating (decreasing) the preset flow rate from the stable state repeatedly appear. The stable state in this embodiment means a state wherein the deviation between the measured flow rate and the preset flow rate is smaller than the predetermined value. In addition, the transitional state in this embodiment means a state wherein the deviation between the measured flow rate and the preset flow rate is bigger than the predetermined value, and is a period of, for example, 100 msec~300 msec after a timing when the preset flow rate fluctuates.

Then in this embodiment, in order to control the flow rate accurately in the stable state and the transitional state respectively, a control coefficient for stable state used for the PID operation in the stable state and a control coefficient for transitional state used for the PID operation in the transitional state are set separately and stored in the control coefficient storage part 33. In other word, a proportion coefficient, the integration coefficient and the differential coefficient as the control coefficient for stable state, and the proportion coefficient, the integration coefficient and the differential coefficient as the control coefficient for transitional state are stored in the control coefficient storage part 33 in this embodiment.

More concretely explained, a gain of the control coefficient for stable state is set to be a little bigger in order to keep the behavior of the measured flow rate in the stable state, and a gain of the control coefficient for transitional state is set to be a little smaller in order to prevent the undershoot or the overshoot immediately after the fluctuation of the preset flow rate.

More specifically, each of the control coefficients for stable state and transitional state is so set to make the fluctuation of the valve aperture operation amount (the applied voltage) to the deviation between the preset flow rate and the measured flow rate more moderate, in other word, to make the valve aperture operation amount (the applied voltage) in the transitional state smaller than that in the stable state in case that the deviation is the same.

The transitional/stable state judgment part 34 judges whether the behavior of the measured flow rate is in the stable state or in the transitional state, and outputs a behavior state signal indicating either the stable state or the transitional state to the valve aperture operation amount output part 32.

Concretely, the transitional/stable state judgment part 34 judges the predetermined period from the timing when the preset flow rate fluctuates from the first flow rate to the second flow rate that is different from the first flow rate as in the transitional state, and judges the period that is after the predetermine period passes and wherein the preset flow rate is the second flow rate as in the stable state.

The predetermined period is determined by a result of an experiment or the like, and is set as a previously calculated time period based on, for example, the difference between the first flow rate and the second flow rate, and is for example 100 msec~300 msec in this embodiment.

The valve aperture operation amount calculation part for switching time 35 calculates a middle value of the valve aperture operation amount in the stable state or its vicinity value as the valve aperture operation amount for switching time based on a plurality of valve aperture operation amounts output at a plurality of timings by the valve aperture operation amount output part 32 in the stable state.

Concretely, the valve aperture operation amount calculation part for switching time 35 is so configured to output the mean value of the valve aperture operation amount output by the valve aperture operation amount output part 32 in the stable state as the above-mentioned valve aperture operation amount for switching time. The valve aperture operation amount calculation part for switching time 35 in this embodiment obtains the applied voltage output by the valve aperture operation amount output part 32 one after another and calculates the mean value of the obtained applied voltage one after another as the applied voltage for switching time as being the valve aperture operation amount for switching time.

Figure 5:
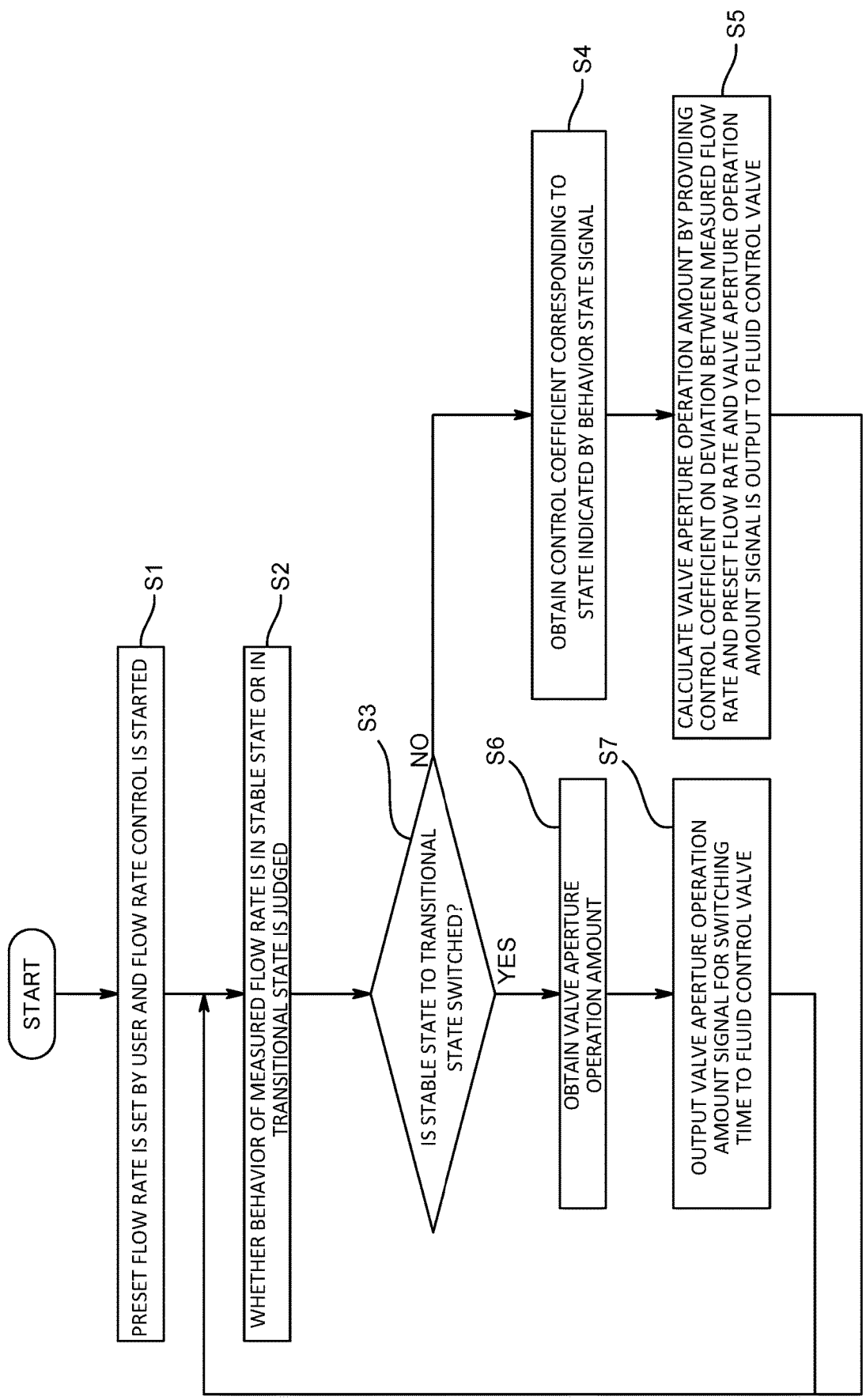
FIG. 5 is a flow chart showing behavior of the fluid control unit of the first embodiment.

Next, an operation of the fluid control unit 100 in this embodiment will be explained with reference to a flow chart in FIG. 5.

First, a user sets the preset flow rate by the use of the input device such as, for example, a keyboard or the like then the control of the flow rate is started (S1).

When the control of the flow rate is started, the transitional/stable state judgment part 34 judges whether the behavior of the measured flow rate is in the stable state or in the transitional state, and transmits the behavior state signal indicating which state to the valve aperture operation amount output part 32 (S2). A method to judge whether the state is in the stable state or in the transitional state is as mentioned above.

Then, when the preset flow rate fluctuates in the state wherein the deviation between the measured flow rate and the preset flow rate is small and the behavior of the measured flow rate is stable, the behavior of the measured flow rate is switched from the stable state to the transitional state.

Figure 6:
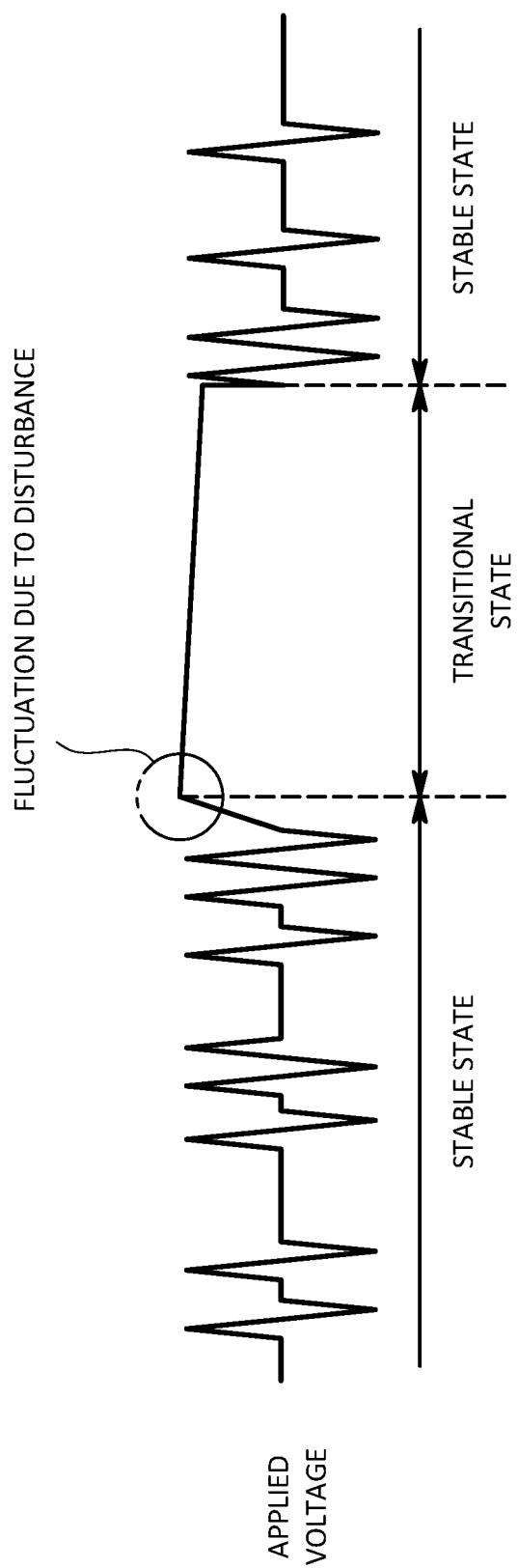
FIG. 6 is a diagram to explain fluctuation of an applied voltage due to disturbance in the first embodiment.

In this case, as shown in FIG. 6, if fluctuation (hereinafter called as noise fluctuation) of the applied voltage is caused due to disturbance at a timing of switching from the stable state to the transitional state, the applied voltage after the noise fluctuation is not returned immediately, and the applied voltage in the transitional state is kept in a state higher or lower than the middle value in the stable state. This is because that each of the control coefficients is so set to moderate the fluctuation of the valve aperture operation amount to the deviation between the measured flow rate and the preset flow rate more in the transitional state than that in the stable state. As a result of this, the valve aperture of the fluid control valve 20 becomes unexpectedly big or small so that, for example, a spike-shaped peak occurs.

Then, in this embodiment the valve aperture operation amount output part 32 judges whether or not the state is changed from the stable state to the transitional state based on the behavior state signal transmitted from the transitional/stable state judgment part 34 (S3).

In case that the behavior of the measured flow rate is not switched, the valve aperture operation amount output part 32 obtains the control coefficient for stable state or the control coefficient for transitional state corresponding to the state indicated by the behavior state signal from the control coefficient storage part 33 (S4). Then, the applied voltage as being the valve aperture operation amount of the fluid control valve 20 is calculated by providing the deviation between the preset flow rate and the measured flow rate with the control coefficient and the valve aperture operation amount signal indicating the value of the applied voltage is output to the fluid control valve 20 (S5). At this time, the valve aperture operation amount calculation part for switching time 35 calculates the mean value of the valve aperture operation amount output by the valve aperture operation amount output part 32 in the stable state as the valve aperture operation amount for switching time on a constant basis.

Meanwhile, in case that the behavior of the measured flow rate is switched from the stable state to the transitional state, the valve aperture operation amount output part 32 obtains the applied voltage for switching time calculated by the valve aperture operation amount calculation part for switching time 35 at a timing when the behavior is switched (S6).

Then, the valve aperture operation amount signal for switching time indicating a magnitude of the applied voltage for switching time is output to the fluid control valve 20 (S7).

Figure 7:
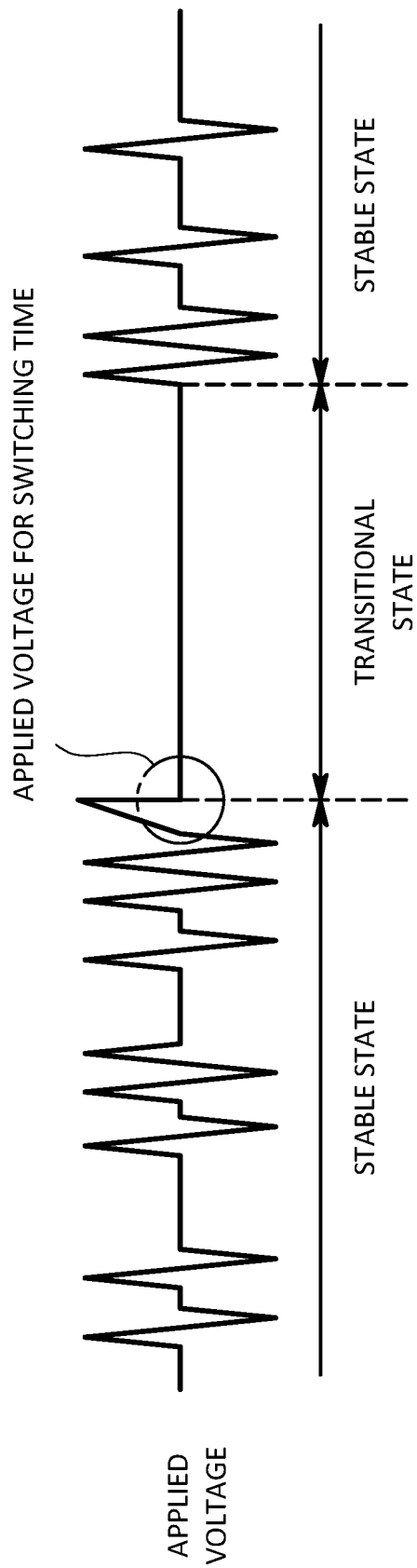
FIG. 7 is a diagram to explain an applied voltage for switching time in the first embodiment.

As mentioned above, it is possible to stabilize the applied voltage in the transitional state around the middle value of the applied voltage in the stable state shown in FIG. 7 by applying the applied voltage for switching time to the fluid control valve 20 at a timing when the behavior is switched from the stable state to the transitional state.

In accordance with the fluid control unit 100 having the above-mentioned arrangement, since the applied voltage for switching time is applied to the fluid control valve 20 at a timing when the stable state is switched to the transitional state even though a noise fluctuation occurs at the timing, the applied voltage after the noise fluctuation immediately becomes the applied voltage for switching time and returns to a value around the middle value in the stable state. Then, after the applied voltage for switching time is applied, the control state becomes almost the same as the state without noise fluctuation at the timing when the stable state is switched to the transitional state. As a result of this, it becomes possible to prevent the peak generating in the measured flow rate resulting from the noise fluctuation without unexpectedly changing the valve aperture of the fluid control valve 20.

Figure 8:
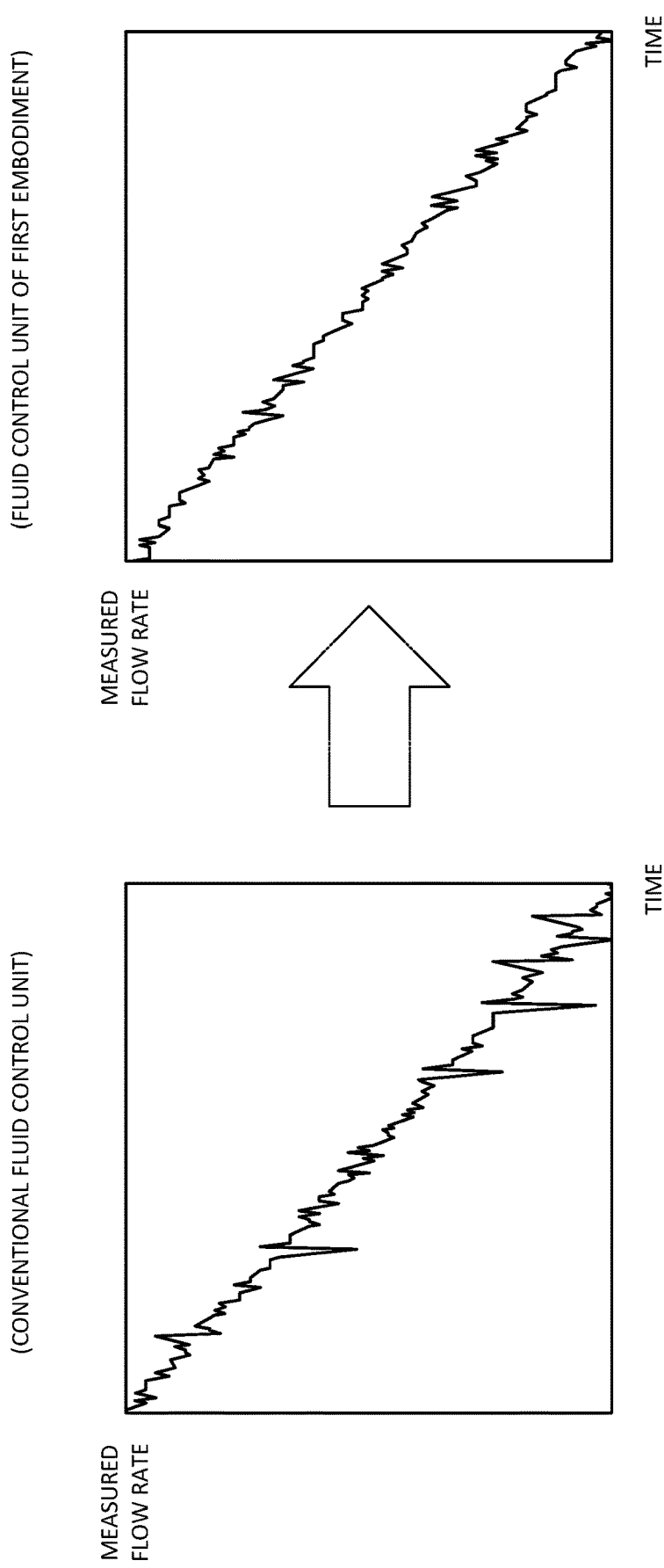
FIG. 8 is a diagram showing an experimental result using the fluid control unit in the first embodiment.

As this operation and effect of the fluid control unit 100 of this embodiment is clear from the experiment result shown in FIG. 8, it is possible to reduce the spike-shaped peak that generates in a case of using a conventional fluid control unit.

The present claimed invention is not limited to the first embodiment.

For example, the above-mentioned valve aperture operation amount output part 32 of the above-mentioned embodiment outputs the valve aperture operation amount signal for switching time at the timing when the stable state is switched to the transitional state, however, it may output the valve aperture operation amount signal for switching time prior to passing a predetermined time from the switching time.

In this case, the predetermined time may be a time after the stable state is switched to the transitional state until the fluid control valve 20 starts moving, namely a time until the applied voltage is charged to the fluid control valve 20.

In accordance with this arrangement, it is possible to output the valve aperture operation amount signal for switching time before the fluid control valve 20 starts moving after the stable state is switched to the transitional state. Then, similar to the above-mentioned embodiment, it is possible to restrain the peak generating in the measured flow rate resulting from the noise fluctuation.

In addition, the valve aperture operation amount calculation part for switching time 35 of the above-mentioned embodiment calculates the mean value of the valve aperture operation amount in the stable state as the valve aperture operation amount for switching time, however, it may calculate a mean value of the maximum value and the minimum value of the valve aperture operation amount in the stable state or a mean value of the valve aperture operation amount contained in a predetermined control time period in the stable state as the valve aperture operation amount for switching time.

Furthermore, the valve aperture operation amount output part 32 may have the function of calculating the valve aperture operation amount for switching time.

Second Embodiment

Next, a fluid control unit of a second embodiment in accordance with this invention will be explained.

In the first embodiment, the control coefficient for transitional state that is different from the control coefficient for stable state used before the fluctuation is used after the preset flow rate fluctuates. The fluid control unit in accordance with the second embodiment is different from the fluid control unit in accordance with the first embodiment in a point wherein the control coefficient for transitional state is not necessarily used after the preset flow rate fluctuates.

In order to explain this point, first, the behavior of the measured flow rate that can happen to the fluid control unit 100 in accordance with the first embodiment will be described.

The fluid control unit 100 in accordance with the first embodiment is so configured to output the applied voltage for switching time at the timing when the stable state is switched to the transitional state. Since the applied voltage for switching time is the mean value of the applied voltage in the stable state, some difference may occur between the applied voltage for switching time and the middle value of the applied voltage in the stable state.

Figure 9:
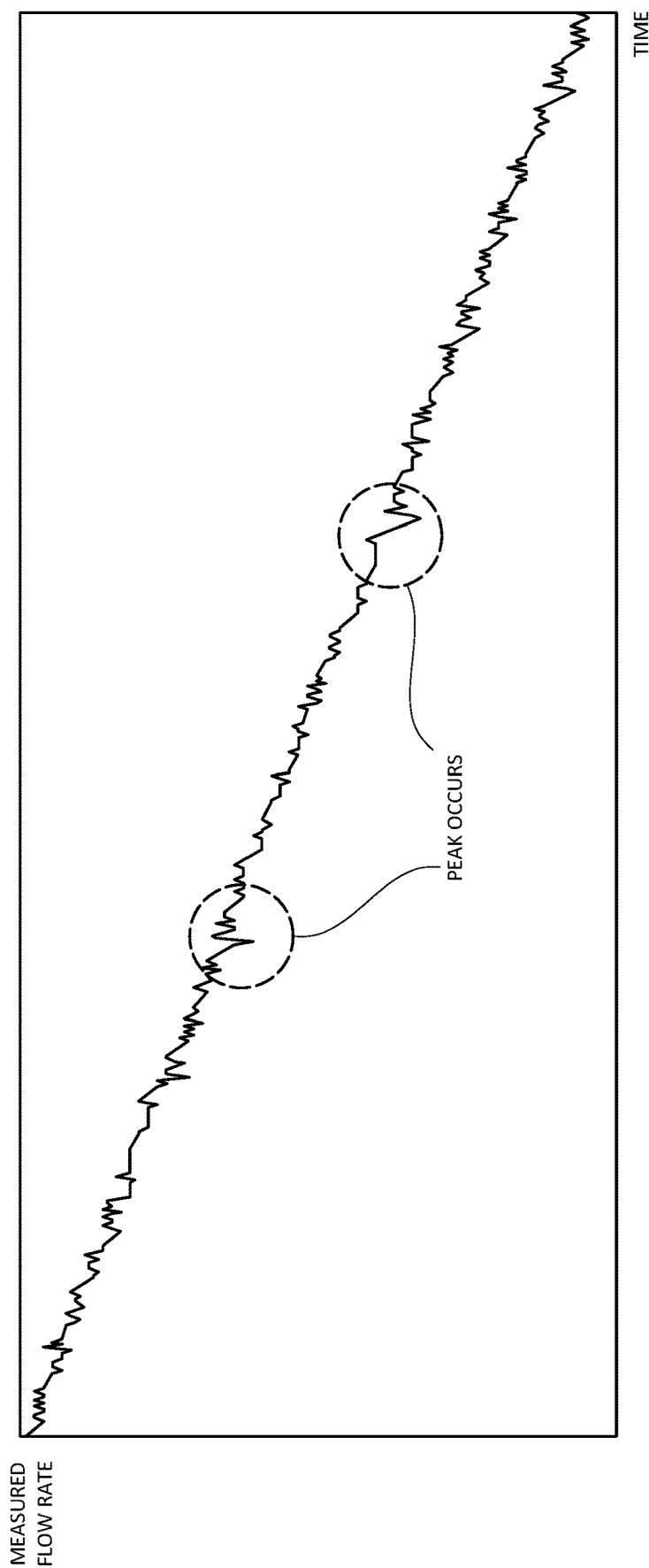
FIG. 9 is a diagram to explain a peak in a measured flow rate that can occur in the first embodiment.

Then, if the difference is big, similar to a case shown in FIG. 6, namely similar to a case wherein a noise fluctuation occurs at the timing when the stable state is switched to the transitional state, the valve aperture of the fluid control valve 20 in the transitional state unexpectedly changes and the peak may generate in the measured flow rate as shown in FIG. 9 although the peak is smaller than the spike-shaped peak shown in FIG. 8.

Then, the fluid control unit 100 in accordance with the second embodiment is so configured that the control coefficient in the stable state prior to fluctuation is continuously used also after the timing of the fluctuation in case that the fluctuation amount of the preset flow rate is smaller than a predetermined threshold.

More specifically explained, in the second embodiment, the transitional/stable state judgment part 34 compares the difference between the first flow rate and the second flow rate with the predetermined threshold based on the preset flow rate received by the preset flow rate receiving part 31 in case that the preset flow rate fluctuates from the first flow rate to the second flow rate that is different from the first flow rate.

Figure 10:
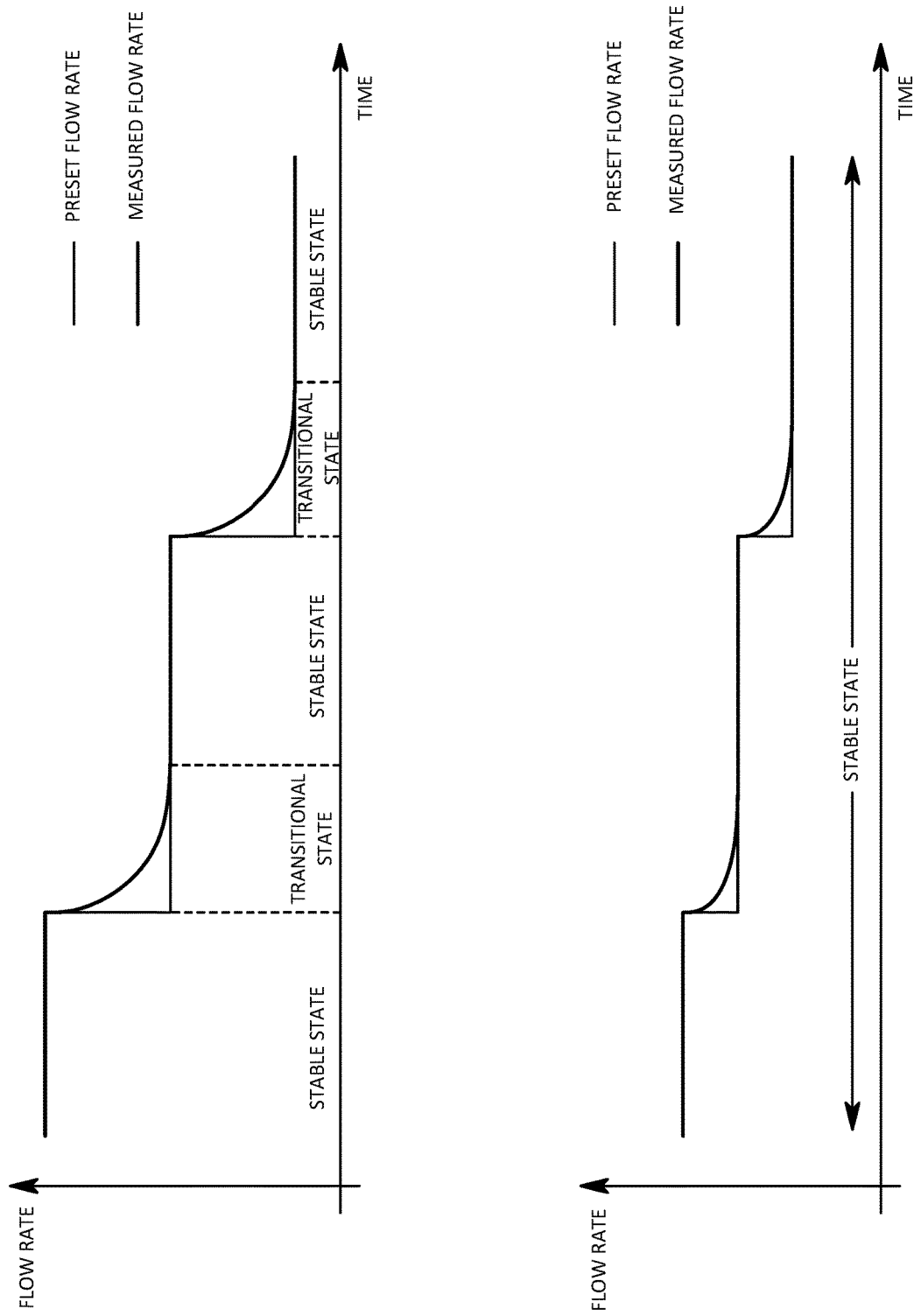
FIG. 10 is a diagram to explain a stable state and a transitional state of the second embodiment.

In case that the difference is bigger than the threshold, similar to the first embodiment, the transitional/stable state judgment part 34 judges the predetermined period as being in the transitional state based on the timing when the preset flow rate fluctuates from the first flow rate to the second flow rate as shown in the upper section of FIG. 10.

Meanwhile, in case that the difference is smaller than the threshold, the transitional/stable state judgment part 34 judges a period while the preset flow rate is the second flow rate as being in the stable state without providing the predetermined period based on the timing when the first flow rate fluctuates to the second flow rate as shown in the lower section of FIG. 10.

In accordance with this arrangement, in case that the difference between the first flow rate and the second flow rate is smaller than the threshold, the behavior state signal transmitted from the transitional/stable state judgment part 34 to the valve aperture operation amount output part 32 indicates the stable state also after the preset flow rate fluctuates from the first flow rate to the second flow rate.

Accordingly, the valve aperture operation amount output part 32 obtains the control coefficient for stable state used in the stable state prior to the fluctuation of the preset flow rate also after the preset flow rate fluctuates from the first flow rate to the second flow rate and calculates the applied voltage as being the valve aperture operation amount by the use of the control coefficient for stable state also after the preset flow rate fluctuates.

Figure 11:
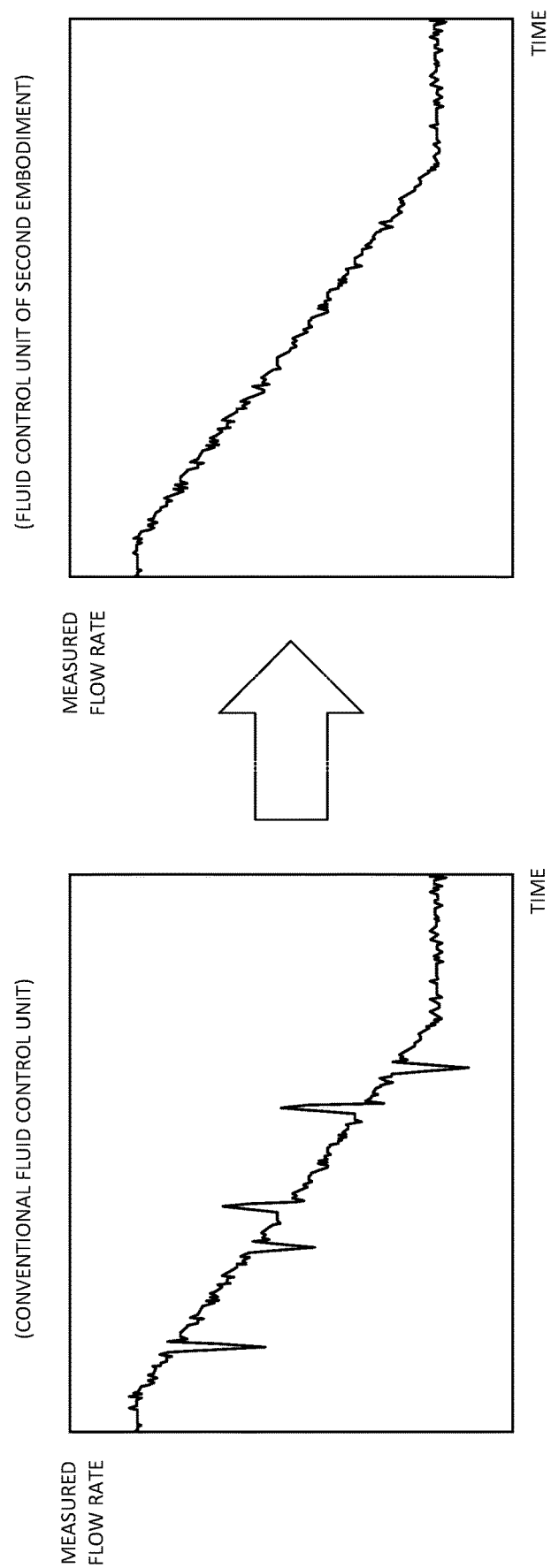
FIG. 11 is a diagram showing an experiment result using a fluid control unit in the second embodiment.
Figure 12:
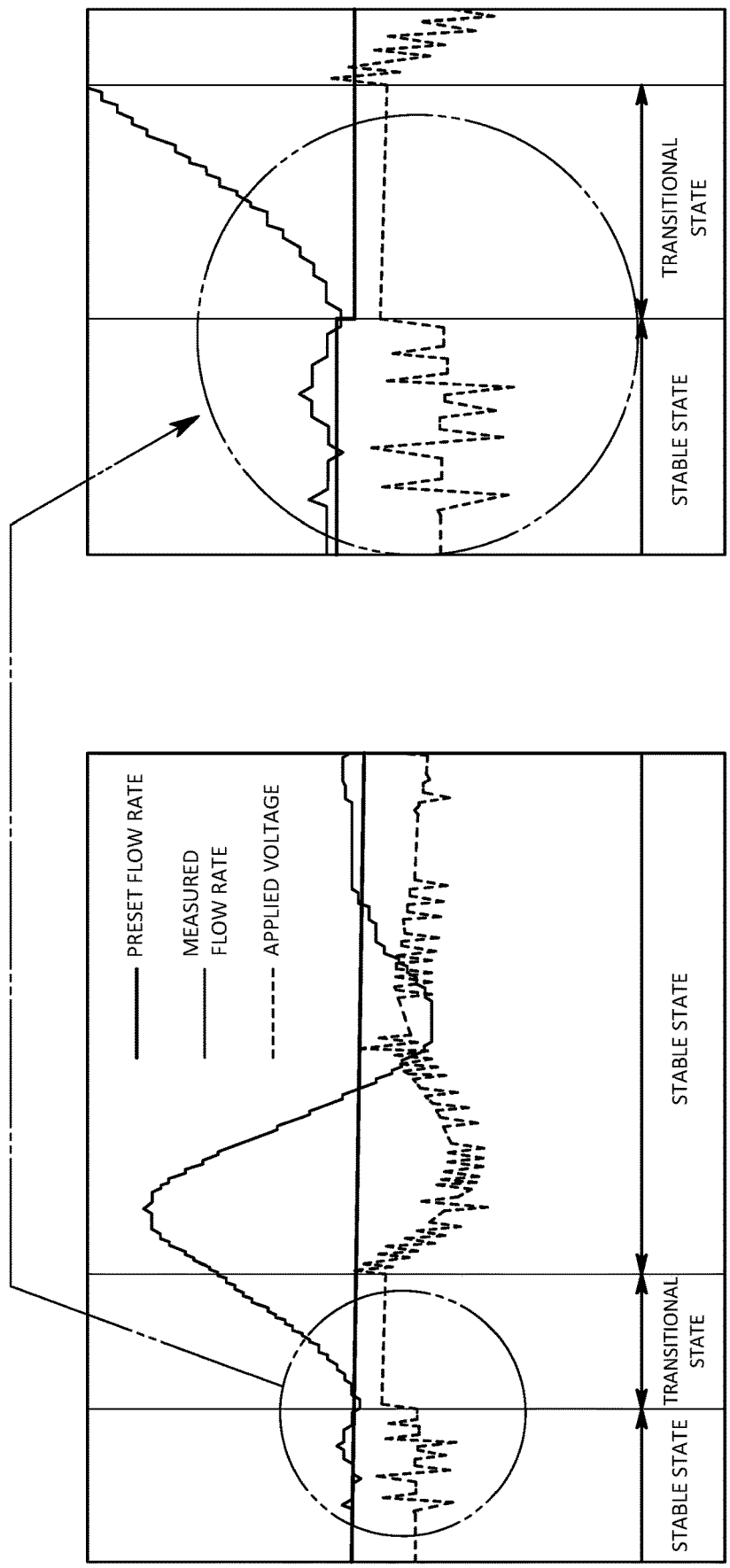
FIG. 12 is a diagram to explain a peak in a measured flow rate that generates in a conventional fluid control unit.
Figure 13:
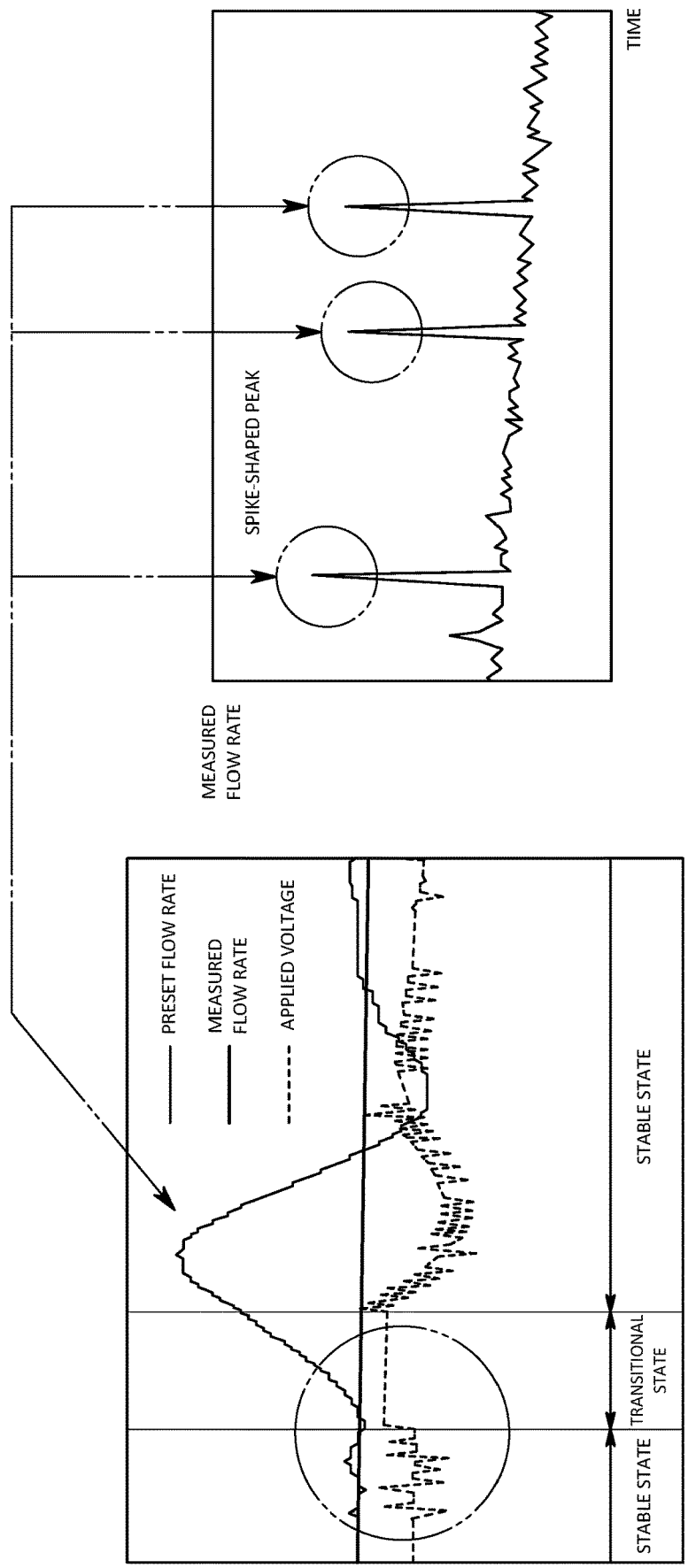
FIG. 13 is a diagram to explain a peak in a measured flow rate that generates in a conventional fluid control unit.

In accordance with the fluid control unit 100 of the second embodiment having the above-mentioned arrangement, since the control coefficient in the stable state is continuously used also after the timing when the preset flow rate fluctuates, even though the valve aperture operation amount fluctuates at the timing when the stable state is switched to the transitional state, it is possible to immediately return the valve aperture operation amount to a value near the middle value in the stable state. In accordance with this arrangement, as shown in FIG. 11, it is possible to further suppress the peak generating in the measured flow rate more than that in the first embodiment so that the measured flow rate can follow the preset flow rate more accurately.

Furthermore, since the control coefficient in the stable state is continuously used in case that the difference between the first flow rate and the second flow rate is smaller than the predetermined threshold, it is also possible to prevent undershoot or overshoot.

The present claimed invention is not limited to each of the above-mentioned embodiments.

For example, the flow rate measurement part 10 is not limited to using the thermal type flow rate sensor, and may use, for example, a pressure type flow rate sensor.

In addition, the flow channel resistor 13 uses a laminar flow element, however, may use, for example, an orifice or the like.

Furthermore, the fluid control valve 20 is not limited to the piezoelectric type, and may be other type such as a solenoid type.

In addition, it is a matter of course that the present claimed invention is not limited to the above-mentioned embodiments, and may be variously modified without departing from a spirit of the invention.

LIST OF REFERENCE CHARACTERS

100 . . . fluid control unit
10 . . . flow rate measurement part
20 . . . fluid control valve
31 . . . preset flow rate receiving part
32 . . . valve aperture operation amount output part
33 . . . control coefficient storage part
34 . . . transitional/stable state judgment part
35 . . . valve aperture operation amount calculation part for switching time

The invention claimed is:

1. A fluid control unit comprising:
a flow rate measurement part that measures a flow rate of a fluid flowing in a flow channel,
a fluid control valve that is arranged in the flow channel, and
a valve aperture operation amount output part that outputs a valve aperture operation amount signal indicating a valve aperture operation amount of the fluid control valve obtained based on a deviation between a previously preset flow rate and a measured flow rate of the flow rate measurement part, and a previously set control coefficient, wherein
the control coefficient for a stable state in which the measured flow rate is stable and the control coefficient for a transitional state in which the measured flow rate fluctuates due to fluctuation of the preset flow rate are set to moderate the valve aperture operation amount according to the deviation more in the transitional state than in the stable state, and
at a switching time when the stable state is switched to the transitional state or before a predetermined time period passes after the switching time, the valve aperture operation amount output part outputs a valve aperture operation amount output signal for the switching time indicating a valve aperture operation amount for the switching time that is calculated based on a plurality of valve aperture operation amounts output at a plurality of timings in the stable state prior to the switching time.

2. The fluid control unit described in claim 1, and comprising a valve aperture operation amount calculation part for the switching time that calculates a mean value of the valve aperture operation amounts output by the valve aperture operation amount output part in the stable state as the valve aperture operation amount for the switching time.

3. The fluid control unit described in claim 1, wherein
in case that the preset flow rate fluctuates from a first flow rate to a second flow rate and a difference between the first flow rate and the second flow rate is smaller than a predetermined threshold,
the control coefficient in the stable state before the preset flow rate fluctuates from the first flow rate to the second flow rate is continuously used also after the switching time when the preset flow rate fluctuates from the first flow rate to the second flow rate.

4. The fluid control unit described in claim 3, and further comprising
a transitional/stable state judgment part that compares the difference between the first flow rate and the second flow rate with the predetermined threshold, wherein
in case that the difference is larger than the predetermined threshold, the transitional/stable state judgment part judges that a predetermined period after the switching time when the preset flow rate fluctuates from the first flow rate to the second flow rate is in the transitional state, and in case that the difference is smaller than the predetermined threshold, the transitional/stable state judgment part judges that a period from the switching time when the preset flow rate fluctuates from the first flow rate to the second flow rate to a time when the preset flow rate is the second flow rate is in the stable state.

5. The fluid control unit described in claim 1, wherein
the preset flow rate is set as a flow rate that decreases or increases in a phased manner over a predetermined period.

6. A program storage media for a fluid control unit that stores programs used for the fluid control unit comprising:
a flow rate measurement part that measures a flow rate of a fluid flowing in a flow channel and a fluid control valve provided in the flow channel, and that provides a computer with a function as a valve aperture operation amount output part that outputs a valve aperture operation amount signal indicating a valve aperture operation amount of the fluid control valve obtained based on a deviation between a previously preset flow rate and a measured flow rate of the flow rate measurement part and a previously set control coefficient, wherein
the control coefficient for a stable state in which the measured flow rate is stable and the control coefficient for a transitional state in which the measured flow rate fluctuates due to fluctuation of the preset flow rate are set to moderate the valve aperture operation amount according to the deviation more in the transitional state than in the stable state, and at a switching time when the stable state is switched to the transitional state or before a predetermined time period passes after the switching time, the valve aperture operation amount output part outputs a valve aperture operation amount output signal for the switching time indicating a valve aperture operation amount for the switching time that is calculated based on a plurality of valve aperture operation amounts output at a plurality of timings in the stable state prior to the switching time.

7. A fluid control unit comprising:

a flow rate measurement part that measures a flow rate of a fluid flowing in a flow channel, a fluid control valve that is arranged in the flow channel, and a valve aperture operation amount output part that outputs a valve aperture operation amount signal indicating a valve aperture operation amount of the fluid control valve obtained based on a deviation between a previously preset flow rate and a measured flow rate of the flow rate measurement part and a previously set control coefficient, wherein the control coefficient for a stable state in which the measured flow rate is stable and the control coefficient for a transitional state in which the measured flow rate fluctuates due to fluctuation of the preset flow rate are set respectively, and at a switching time when the stable state is switched to the transitional state or before a predetermined time period passes after the switching time, the valve aperture operation amount output part outputs a valve aperture operation amount output signal for the switching time indicating a valve aperture operation amount for the switching time that is calculated based on a plurality of valve aperture operation amounts output at a plurality of timings in the stable state prior to the switching time.

* * * * *